July 5, 1949.                     H. J. BIRCHALL                     2,475,275
                       LENS OF VARIABLE FOCAL POWER HAVING
                              SURFACES OF INVOLUTE FORM
                                 Filed March 7, 1946
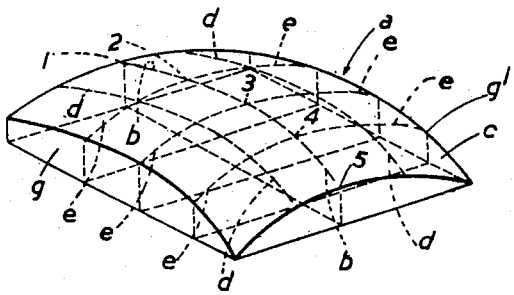
*Inventor*
HENRY JAMES BIRCHALL
By Richardson and David
*Attorneys*

Patented July 5, 1949

2,475,275

UNITED STATES PATENT OFFICE 2,475,275

LENS OF VARIABLE FOCAL POWER HAVING SURFACES OF INVOLUTE FORM

Henry James Birchall, Shirley, England

Application March 7, 1946, Serial No. 652,679
In Great Britain January 19, 1945

Section 1, Public Law 690, August 8, 1946
Patent expires January 19, 1965

2 Claims. (Cl. 88—57)

The present invention relates to lenses having gradually changing focal power for use with spectacles, field and opera glasses, telescopes and other optical instruments.

Bifocal and other multifocal spectacle lenses are known and to some extent in practical use, but it is scientifically correct to state that they suffer from the disadvantage that there is an abrupt step or change in transition between the different refractive portions thereof. Experiments have been carried out in multifocal lenses for many years with a view to avoiding the perceptibly abrupt change in the transition from one region of definite refractive power to another region of different definite refractive power, but so far as I am aware none of the experiments made have resulted in the production of a lens which in practice avoids this abrupt change and is devoid of distortion of image on each side of an axis containing the focal point of the lens. It has, however, been suggested to construct a lens for sight testing, correcting irregular defects in the sight and for making distorting lenses whose respective surfaces have been ground with differing curves, the one surface being ground with a surface which is a portion of an oblique cone and which is symmetrical about a medial line of the lens and the other surface being ground with an involute curve on an axis of curvature which is at right angles to the said medial line. With a view to providing a solution to this abrupt change defect I have proposed in U. S. patent specification No. 2,001,952 a lens of gradually varying focal power.

This patented invention has resulted in marked advantages to patients requiring bifocal or multifocal lenses. I have, however, been conducting research with a view to achieving certain additional and important refinements destined to reduce distortion of image found to arise where vision is through regions of the lens remote from a medial plane of the lens.

This applies to those lenses intended for use as spectacle lenses as well as to those described in U. S. patent specification No. 2,001,952 where two such lenses are superposed longitudinally for use in instruments or apparatus.

Further, it has been found that the uses of this type of lens surface are restricted unless some variety of curvature in one or other meridian is introduced according to the requirements of design for a particular purpose.

The present invention is to enable use to be made of the full possibilities of this variable surface by correction of distortion.

According to the present invention there is provided a lens of gradually varying focal power characterised in that one of its surfaces is formed with a progressively changing curvature of involute form along the medial plane of the lens and in planes parallel thereto, so that in the case of a convex surface the curvature gradually increases from the top to the bottom of the lens and in the case of a concave surface the curvature gradually decreases from the top to the bottom of the lens, and characterised in that the curved surface in planes at right angles to the medial plane is also of involute form and progressively changes in curvature in such a manner that from the medial plane to the edges of the lens where the surface is convex the curvature decreases, and where the said surface is concave the curvature increases.

By "involute form" I mean the shape of a curve generated by the locus of a point in a straight line that rolls without sliding on a curve in the plane of that curve.

A lens according to the above description may be ground or it may be moulded by means of a mould whose curvature conforms to the surface to be moulded as hereinbefore described.

In order that my invention may be readily carried into effect, I have illustrated on the annexed drawing one diagram of a lens having variable focal power. This diagram is not to be regarded as a working drawing but as an indication of the result of certain experiments made at this date to achieve variable focal power in lenses as hereinafter particularly described and claimed.

The single diagram is a perspective view of a plano-convex lens having variable focal power, the curvatures illustrated being grossly exaggerated for the purpose of explaining the principles of the basic idea.

Referring to the diagram, the reference $a$ indicates a lens, the dotted line $b$ is the curve of intersection of an imaginary medial plane perpendicular to the plane of the underside of the lens with a surface $c$ which is curved in the form of an involute in two planes at right angles. The dotted lines $d$ are lines of intersection formed by planes perpendicular to the plane of the underside of the lens and parallel to the medial plane and these lines $b$ and $d$ are of involute form and of continuously increasing curvature from edge to edge of the lens $a$ so that the lens $a$ has different focal powers at different points on any of these various lines $b$ and $d$. The same surface $c$ of the lens $a$ is also peculiarly curved in planes at right angles to the medial plane and the dotted lines *e* indicate lines of intersection at right angles to the medial plane and to the lines *d* and consisting of involute curves of continuously decreasing curvature from the medial plane to the edges *g* and *g1* of the lens. By this arrangement there is provided a lens having a surface compounded by involute curves in two planes at right angles and this combination of involute curves on the same surface and arranged on planes at right angles have the result that there is no abrupt change in the transition from one region of refractive power to another region of different refractive power and distortion of image on each side of the medial plane of the lens is materially reduced.

On the medial plane the numerals 1, 2, 3, 4 and 5 indicate different lens powers at those points, but since those points are on variable curves it will be understood that as the curves *e* bend towards the edges *g* and *g1* of the lens, every individual point along each particular curve will have a different focal power which varies from the medial plane towards the edges *g* and *g1* of the lens. It will be seen, therefore, that under the technique of the invention variable focal power without abrupt change in a lens is obtainable to an accurate degree through regions on either side of the medial plane where in the past distortion of image appertained and, as a consequence, conditions were not satisfactory to a wearer of spectacles fitted with so-called "variable lenses."

The underside of the lens is preferably left in the rough so that any curvature or curvatures may be ground thereon in accordance with an optical prescription.

The form of the invention illustrated is especially intended for use in spectacles and the effect obtained is that over a given distance along the medial plane a gradual change in refractive power is introduced. Either or both ends of the variable lens above described may be merged into a spherical surface of power equal or substantially equal to the power of the variable lens on the medial plane at that end.

In the case of a concave lens according to the invention having one of its surfaces formed with a progressively changing curvature of involute form, the curvature of the surface *c* along the medial plane and planes parallel thereto as represented by the dotted lines *d* of the diagram will gradually decrease from the top to the bottom of the lens and the curvature in planes at right angles to the medial plane as represented by the dotted lines *e*, will gradually increase from the medial plane to the edges *g* and *g1* of the lens.

What I claim is:

1. A lens of gradually varying focal power characterised in that one of its surfaces is formed with a progressively changing curvature of involute form along the medial plane of the lens and in planes parallel thereto, so that in the case of a convex surface the curvature gradually increases from the top to the bottom of the lens and in the case of a concave surface the curvature gradually decreases from the top to the bottom of the lens, and characterised in that the curved surface in planes at right angles to the medial plane is also of involute form and progressively changes in curvature in such a manner that from the medial plane to the edges of the lens where the surface is convex the curvature decreases, and where the said surface is concave the curvature increases.

2. Lens according to claim 1 wherein either or both ends of the variable lens are merged into a spherical surface of power equal to or substantially equal to the power of the variable lens on the medial plane at that end.

HENRY JAMES BIRCHALL.

REFERENCES CITED

The following references are of record in the file of this patent:

UNITED STATES PATENTS

| Number | Name | Date |
| --- | --- | --- |
| 1,143,316 | Poullain et al. | June 15, 1915 |
| 1,677,382 | Bugbee | July 17, 1928 |
| 1,692,973 | Babcock | Nov. 27, 1928 |
| 1,771,844 | Eilenberg et al. | July 29, 1930 |
| 2,001,952 | Birchall | May 21, 1935 |
| 2,005,718 | Dusenberg | June 25, 1935 |
| 2,109,474 | Evans | Mar. 1, 1938 |
| 2,377,344 | Holman | June 5, 1945 |
| 2,381,449 | Holman | Aug. 7, 1945 |

FOREIGN PATENTS

| Number | Country | Date |
| --- | --- | --- |
| 250,268 | Great Britain | July 29, 1926 |